(12) United States Patent
Carr et al.

(10) Patent No.: US 6,481,213 B2
(45) Date of Patent: Nov. 19, 2002

(54) PERSONAL THERMAL COMFORT SYSTEM USING THERMAL STORAGE

(75) Inventors: Peter Carr, Cary, NC (US); John J. Lindberg, Cary, NC (US)

(73) Assignee: Instatherm Company, Cary, NC (US)

( * ) Notice: Subject to any disclaimer, the term of this patent is extended or adjusted under 35 U.S.C. 154(b) by 0 days.

(21) Appl. No.: 09/973,413

(22) Filed: Oct. 9, 2001

(65) Prior Publication Data

US 2002/0043068 A1 Apr. 18, 2002

Related U.S. Application Data

(60) Provisional application No. 60/240,875, filed on Oct. 13, 2000.

(51) Int. Cl.[7] .................................................. F25B 21/02
(52) U.S. Cl. ............................................. 62/3.2; 62/3.3
(58) Field of Search ............................. 62/3.2, 3.3, 3.7, 62/430

(56) References Cited

U.S. PATENT DOCUMENTS

| | | | |
|---|---|---|---|
| 3,040,538 A | 6/1962 | Alsing | |
| 4,306,613 A | 12/1981 | Christopher | |
| 4,872,397 A | 10/1989 | Demeter et al. | |
| 4,922,998 A | 5/1990 | Carr | |
| 5,038,850 A | * 8/1991 | Choi | 165/10 |
| 5,054,540 A | 10/1991 | Carr | |
| 5,074,116 A | 12/1991 | Kadotani et al. | |
| 5,135,436 A | 8/1992 | Levy et al. | |
| 5,358,444 A | 10/1994 | Helm et al. | |
| 5,360,374 A | 11/1994 | Wyon et al. | |
| 5,367,879 A | * 11/1994 | Doke et al. | 62/3.6 |
| 5,403,232 A | 4/1995 | Helm et al. | |
| 5,499,504 A | 3/1996 | Mill et al. | |
| 5,634,343 A | * 6/1997 | Baker, III | 222/146.6 |
| 5,653,111 A | * 8/1997 | Attey et al. | 165/170 |
| 5,713,208 A | 2/1998 | Chen et al. | |
| 5,720,337 A | 2/1998 | Voss et al. | |
| 5,878,579 A | * 3/1999 | Boyer, III | 62/293 |
| 5,974,804 A | * 11/1999 | Sterling | 60/645 |

* cited by examiner

Primary Examiner—William E. Tapolcai
Assistant Examiner—Mohammad M. Ali
(74) Attorney, Agent, or Firm—Alston & Bird LLP (57) ABSTRACT

The present invention is directed to method and apparatuses for modifying the air of a localized zone to suit personal comfort. This invention includes the heating or cooling of the air in the localized zone with a novel apparatus and inhibiting the concurrent release of byproduct air at undesirable temperatures while using a heat pump. The apparatus includes a thermal storage mass that provides a reservoir for the undesirable heating or cooling effects for later restoration. This restoration would occur at a predetermined time in predetermined amounts, typically when the localized zone is unoccupied.

27 Claims, 7 Drawing Sheets

PERSONAL THERMAL COMFORT SYSTEM USING THERMAL STORAGE

CROSS-REFERENCE TO RELATED APPLICATIONS

This application claims the benefit of U.S. Provisional Application No. 60/240,875 filed Oct. 13, 2000.

FIELD OF INVENTION

The present invention is directed towards environmental air conditioning and heating directed to personal use. More specifically, the present invention is directed to apparatuses and methods designed to give individuals the ability to modify their immediate workstation environment to a more desirable comfort level than that established generally in the building.

BACKGROUND OF THE INVENTION

Modem offices are typically divided into a number of individual workstations with area wide temperature and airflow control. Workstation personnel usually cannot open a window, adjust a thermostat or redirect an air vent to satisfy their individual comfort requirements. This lack of individual comfort control is a constant source of aggravation since occupants usually have different individual comfort levels. This is further compounded by the fact that no matter how well designed a large building is; temperature variations will exist throughout the building thereby adding to the discomfort problem. Addressing individual comfort issues is generally the major complaint item for building managers and, additionally, these comfort issues have been reported as reducing worker productivity by 5–15% (BPAC Engineering, January 2001).

With such a major comfort problem, efforts have been made to provide relief but these approaches have generally required extensive building/workstation modification to accomplish. Personal environmental modules for an individual are known. However, such devices must be directly coupled into the building air duct system to operate. See, for example, U.S. Pat. No. 4,872,397. It is also known to have special ducts distributed throughout modular furniture units, such as partition panels after picking up air directed down from overhead building air ducts. See for example U.S. Pat. No. 5,358,444. The use of "double floors" is also known to distribute the primary building air to individual workstations to provide individual control. See, for example, U.S. Pat. No. 5,135,436. These above-identified known approaches are expensive, are targeted towards new construction rather than existing building retrofits, and provide significant restrictions on the ability to reconfigure an existing workspace.

The use of small active heat pump devices at each workstation is also known. See, for example, U.S. Pat. No. 5,499,504. However, in such systems undesirable heat is concurrently produced at the workstation while the cool air is being generated for added workstation air conditioning. Likewise, the converse is true. Undesirable cooling is vented from such devices concurrently with the desired generation of additional heating. This added, undesired heating (or cooling depending on the mode selected) must be transported out of the workstation environment during operation, such as via complex ductwork. This requirement severely limits the usefulness of such devices. In addition, these active heat pump systems offer no means of reducing electrical power consumption during peak electricity usage periods.

SUMMARY OF THE INVENTION

In one embodiment, the present invention is directed to flexible and energy conscious apparatuses and methods for providing individuals with a level of control of their personal environment over and above the general control provided by the building air conditioning system.

According to a further embodiment, this invention provides a solution to the problem of individual, variable workstation comfort that involves, preferably, a desk mountable combination of a thermal store with an active heat pump device. This preferred apparatus and system of the present invention is designed so that when cool air is being provided, the associated and resulting "heat" produced is contained within the device's thermal store and released to the environment at a later time, preferably at hours when the workstation is not occupied. In this way, no heat is released to the area proximate to the apparatus, thus maximizing the effect of the cooling provided. In other words, a greatly reduced amount of "heat" that is concurrently produced is released to the proximate environment during cooling. Instead, the "heat" is directed to and stored in the device's thermal store, to be released at a later time when the proximate environment is unoccupied, such as, after work hours. Similarly, according to the present invention, when the present inventive apparatus provides desired heated air to the user, the concurrent cooling effect (taking place at the heat pump device) also is not transmitted to the environment during the heating mode when the heated air is produced and directed to a user, but is contained by reducing the enthalpy, or heat content, of the unit's thermal store, and then "rewarmed" from the environment at a later time when the workspace is not occupied. In this way, the present invention does not have its desired heating/cooling effect marginalized by the concurrent production of air having an unwanted temperature. The present invention accomplishes such enhanced heating and cooling without implementing additional workspace ductwork or other expensive means of directing away air having an unwanted temperature. As a result, the present apparatus and system achieves the desired personal comfort improvements at low cost and at low power levels, an important factor for cooling during high demand, such as during summer electricity peaks. It also requires no other building infrastructure than a standard electrical receptacle.

In yet a further embodiment, the present invention is directed to an apparatus for conditioning a localized environment comprising a thermal storage reservoir comprising a thermal storage mass. The preferred apparatus further comprises a first heat exchange surface in communication with the thermal storage mass and a second heat exchange surface located proximate to an air stream. The second heat exchanger is in communication with a heat pump device with a voltage applied thereto. The heat pump device is in communication with both heat exchangers and capable of reversibly transferring heat from the first heat exchange surface to the second heat exchange surface. The preferred device has an air-moving device to create the air stream and an air duct in communication with the air moving device to direct air taken from a localized zone to a position proximate to the second heat exchange surface. A controller device is used to select cooling or heating modes and the controller device is in communication with the heat pump device. According to the device of the present invention, instead of releasing the resultant heat that is generated during a cooling mode to the surrounding environs, such heat is not released from the device, but is directed to the thermal storage mass and stored concurrently during the cooling mode. Further, when the device is used to provide heated air to an area, the byproduct cooling effect that is necessarily generated during such a heating mode is not taken from the surrounding environs, but instead, is taken from to the thermal storage mass.

In yet another embodiment, the present invention is directed to a method for modifying a localized zone comprising the steps of maintaining a thermal storage mass in a thermal storage reservoir and contacting a first heat exchange surface to the thermal storage mass. A heat pump device is provided in communication with the first heat exchange surface and a second heat exchange surface is provided in communication with the heat pump device. The second heat exchange surface is exposed to an airway and an airflow is directed into the airway, exposing the airflow to the second heat exchange surface to cool the airflow and produce an amount of byproduct heat in the first heat exchange surface. In this way, substantially all of the byproduct heat is directed to the storage mass and stored therein. The heat may then be released from the storage mass at predetermined times and amounts when cooling is not desired. In a similar fashion, the present invention is directed to a method for heating a local environment similar to the method presented immediately above, except that when heating is desired, byproduct cooling is directed to the storage mass thus reducing the enthalpy of the storage mass. The cool storage mass is then rewarmed (or heat charged) at predetermined times and in predetermined amounts when heating is not desired.

DETAILED DESCRIPTION OF THE INVENTION

The device of the present invention is preferably entirely contained within the localized zone occupied by the user. This is contrasted with other systems that need to concurrently transfer thermal energy to the outside of the building envelope. However, when the device is providing cooling the associated amount of heat is not concurrently rejected into the localized zone or out of the building. This is accomplished by containing the heat in the insulated thermal store. When the workstation is no longer occupied the stored heat is then rejected back into the workstation-localized zone. This will typically occur during the evening hours when the building air conditioning system is only lightly loaded and lower cost power is available. In a similar manner when the user requires additional heat the thermal storage reservoir is cooled. If desired, this cooled reservoir can then be returned to a warmed state by reversing the heat pump, when the workstation is not occupied and picking up heat from the air. Since this cooling and heating system is contained totally within the workstation environment the effect it provides is essentially felt only by the user and does not affect neighbors. Typically the system will be mounted on top of a desk for cooling and on the floor for heating.

The thermal store is one key component for the preferred apparatus and system of the present invention. The thermal store acts as a sink for waste heat while providing cooled air or as a partial source of heat energy when providing heated air. Typically the store is thermally insulated so as to minimize losses to the workstation. The thermal storage mass may be as simple as a volume of water for sensible heat storage energy or involve ice formation for improved storage density. Other phase change materials, such as clathrate hydrates, may also be used for improved storage density.

An active heat pump uses energy to cause heat flow between the thermal store and the workstation environment. Its technology may be thermoelectric, vapor compression cycle, absorption cycle, thermionic or other active heat mover. The heat pump allows useful extraction of heat from the circulating air and delivery of this heat to the thermal mass even when the mass temperature is well above the ambient air temperature. This greatly extends the thermal storage capacity of the thermal mass. Similarly, the active heat-pumping element allows useful delivery of heat to the airside, extracting some of this heat from the thermal mass even when the mass temperature is well below the ambient air temperature.

For small self-contained cooling and/or heating systems the thermoelectric heat pump is an ideal device to use. These devices are very compact, affordable and simply require the reversing the polarity of power applied to change the direction of heat flow. As such, thermoelectric modules comprise the preferred heat pumping method for this system. Thermoelectric modules can be inefficient for many purposes but are efficiently used in the personal thermal comfort system by closely matching the power applied to the thermal needs, thus minimizing the power consumed. However, when used to produce heat, full rated voltage is generally appropriate since the associated ohmic heating is desirable.

The charge function is normally carried out when the user of the personal thermal comfort device is not present. During this phase, the heat stored in the thermal store is rejected into the surrounding air, typically cooling the store to well below ambient temperature. Generally this phase will occur during the evening hours and the system blower will be set at the maximum airflow rate to remove heat at the highest possible rate. Typically, charge will be terminated on a charging time or store temperature basis or a combination of both. At this point the system will generally be placed in a charge maintenance mode.

For personal heating, the active elements are configured so that the air side heat exchanger is warmed by the heat pump and some of the heat delivered is removed from the thermal store, cooling it. Once the store is cooled much of the heat output is resistive and a charging cycle is not required for heat output.

In general it is most efficient if the unit is idled when the user is not at the workstation. This can be accomplished by the user directly or facilitated automatically. User presence could be sensed via passive infrared (PIR) device, ultrasonic, personal ID's or computer keystroke activation and the system programmed to react accordingly. Such sensing device can also provide for automatic charging or discharging.

Simple switches allow the user to quickly establish custom operating setpoints such as fan speed and/or outlet temperatures while displays can provide feedback regarding operational mode and condition of the device, such as charge remaining. A computer located near the personal comfort unit could be optionally interfaced to it for advanced control and reporting functions. A graphics user interface on a connected computer can economically provide comfort information and allow user input settings of temperature and timed charge and discharge modes. Wireless connectivity to the computer or other device offers additional control and report functions without the annoyance of cabling.

Optional features added to the personal thermal comfort system could improve the environment for the user's health, comfort and satisfaction and generate increased productivity. A HEPA air filter can be included to remove irritants and allergens from the air stream while an ion generator may be added to enhance wellbeing and/or further reduce particulate pollution. Optionally, aroma generation can be added to the user's requirements. Finally, a small humidification module could be added to the air stream to improve comfort to the user, particularly in winter.

The personal thermal comfort system is typically a single module intended for desktop or floor placement or any other location convenient to the user. However, to minimize impact on desktop space, the system can be located several feet from the user with a small duct to conduct conditioned air to the user.

Therefore, a personal thermal comfort apparatus, system and method are described herein, which embody the present invention to advantageously utilize thermal storage within a localized environment to promote individual thermal comfort control. In one preferred embodiment, the present invention is used within temperature-controlled buildings to modify the available ambient air to suit individual preference. The personal control effect thus provided has little effect on nearby neighbors who may have different temperature preferences. The case for beneficially cooling an incoming airflow for delivery to a user is described first.

Figure 1:
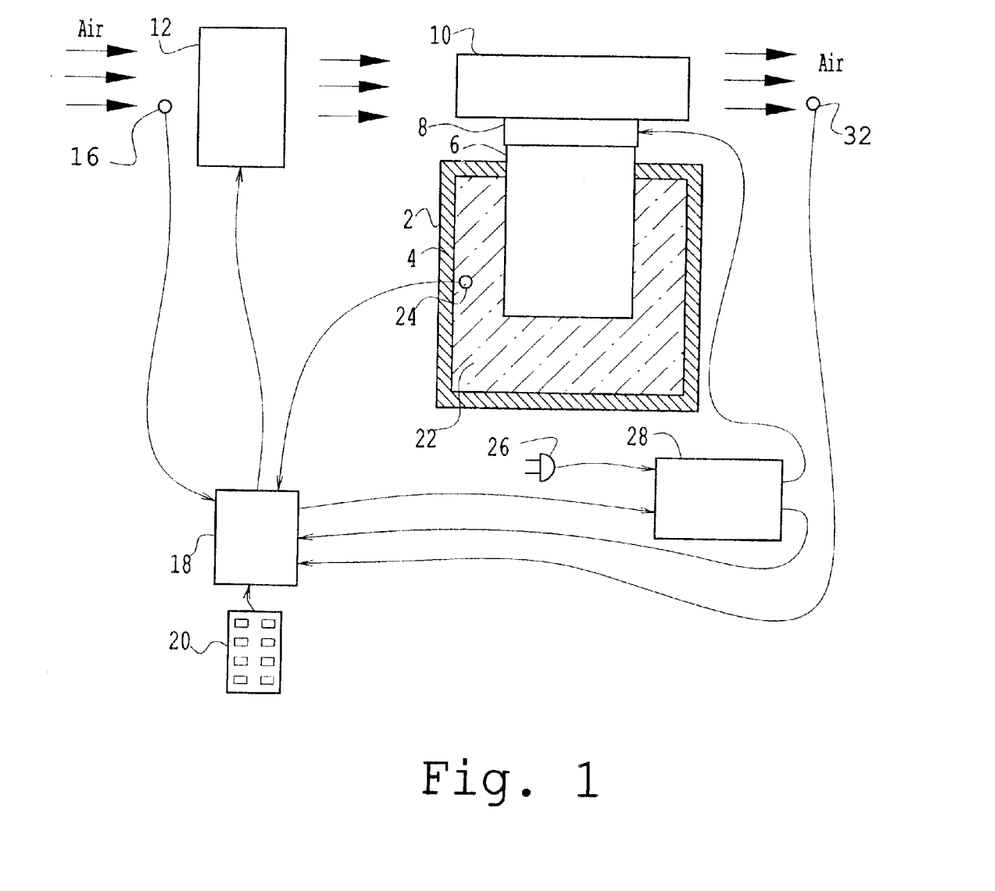
FIG. 1 is a schematic diagram of one embodiment of the apparatus and system of the present invention.

FIG. 1 shows a schematic diagram of one embodiment of the system 1 of the present invention and provides an overview of the components critical to the operation of the device 2. An air-moving device 12 such as a fan pulls inlet air from the local environment. This functional component may be placed upstream or downstream of the air heat exchanger 10 shown downstream of component 12 in this illustration. The air is delivered to the heat exchanger 10 in which heat is transferred from the air to the heat exchanger surface, which has been cooled through the action of the heat pump device 8.

In a preferred embodiment this heat pump device is a thermoelectric device. The active heat pump technology alternatives contemplated by the present invention also include vapor compression cycle, absorption cycle, thermionic or other active heat mover. The cooled air then leaves the device to provide cooling to the user. The heat removed from the air by the heat pump device 8 is delivered to the thermal store heat exchanger 6 to warm the thermal mass 22 held within the device 2 body. Preferably the device 2 is insulated with insulation 4. This is in strong contrast to known personal cooling devices, all of which concurrently reject the heat removed into the surrounding local environment, or they must be connected into the air conditioning system of the building.

According to the present invention, in addition to the heat removed from the air stream, the heat generated by the inefficiency of the heat pumping process must also be stored in the thermal mass 22. Heat flow from the thermal mass to the local environment is restricted due to the insulation 4 surrounding the thermal mass. During the heat removal process, the increasing temperature of the thermal mass 22 preferably is monitored using a temperature transducer 24, which is substantially in thermal contact with the thermal mass. The signal from the transducer 24 is monitored by the control means 18, which controls and terminates the heat pumping action, preferably by switching off the heat pump, or reversing its pumping direction when the thermal mass 22 reaches a predetermined termination temperature. For greater effective control of the cooling function of the device 2, an additional outlet air temperature transducer 32 may be placed in the airflow exiting the heat exchanger 10. The signal from this transducer 34 may be used by the control means 18 to adjust the heat pumping energy delivered by the power supply 28 to the heat pump device 8. In the case of thermoelectric heat pumps, the terminal voltage at the input may be varied to achieve this control. In some cases, the desired function of the device is to reduce the temperature of the air passing therethrough it by a predetermined amount. This can preferably be accomplished by measuring both the inlet temperature using transducer 16 and the outlet temperature using transducer 32 and varying the power to the heat pumping means to achieve the desired temperature differential. Power supply 28 (shown equipped with plug 26) preferably converts alternating current from a receptacle outlet to direct current of the necessary voltage and polarity. As will be understood by one skilled in the field, the power supply for the present invention can be any supply using direct or alternating current, including battery power. The power supply may be integral, located within the device, or may be located remote from the unit and attached thereto such as, for example, by a connector.

After providing cooled air for the user, (discharge operation), the thermal reservoir will typically require heat removal (recharging) to restore its ability to store heat from the airflow during discharge while the device is cooling the air. In order to remove heat from the thermal reservoir, the heat pump device is configured to remove heat from the thermal reservoir and deliver it to an air stream. In one preferred embodiment employing a thermoelectric heat pump, such operation requires that the polarity of the power applied to the terminals is appropriately selected and the fan is typically operated to enhance the ability of the heat exchanger 10 to dissipate the heat removed from the thermal reservoir 22. Power flow, polarity and air movement preferably is coordinated by the control means 18 and user input through an input means 20.

Figure 2:
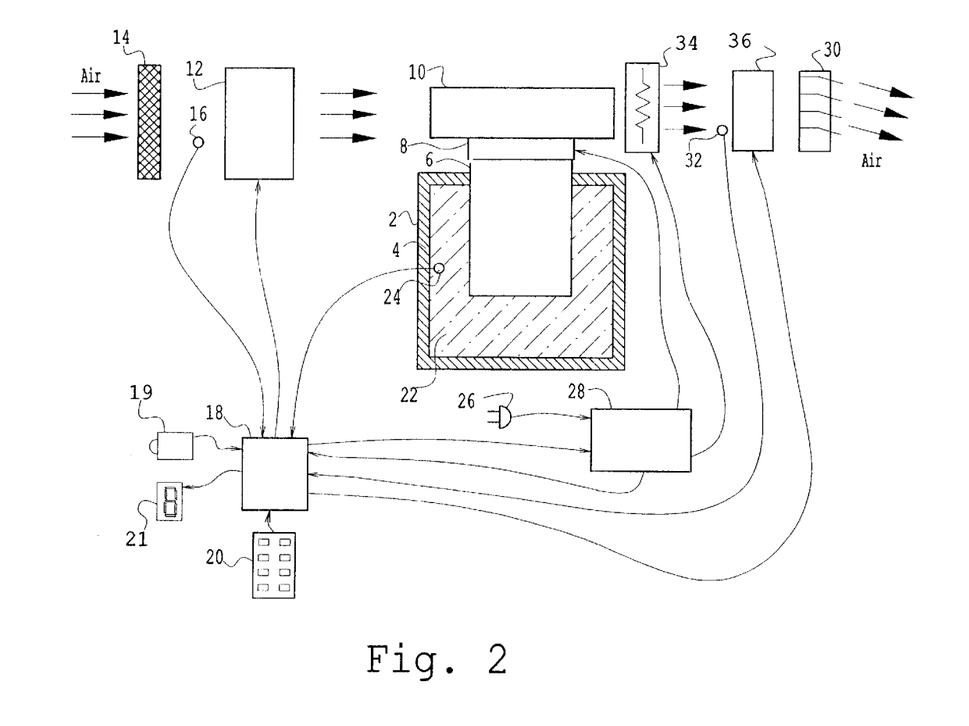
FIG. 2 is a schematic diagram of one embodiment of the apparatus and system of the present invention, which includes optional components to extend its function.

Since the airflow and temperature are individually controlled, other personalized modifications may be added to the system. FIG. 2 shows a block diagram of the system in FIG. 1 with the addition of optional air modification and control components. An air filter 14 removes undesirable materials from the air stream. An optional bypass door (not shown) may be included in the air filter block 14 to permit free air flow during higher flow operation typically associated with the thermal reservoir charge cycle. Resistance heater 34 provides for augmented heating for improved heating performance. An air modification block 36 preferably incorporates one or more of the following functions: air ionization, further air purification, or aromatic enhancement of the air, and humidification of the air. Some or all of these functions could be performed upstream of the heat exchanger 10, or air moving means 12, or both. A duct and outlet nozzle represented by block 30 directs the air stream to the desired location. This nozzle preferably is adjustable to direct the air stream according to the preferences of the user.

In another preferred embodiment, the present invention contemplates incorporating additional optional control components to include a presence detector 19, which allows the control system 18 to determine whether a person is in the immediate vicinity of the personal thermal comfort system. If there is no presence detected, the system can halt or reduce its cooling or heating function to reduce energy consumption and preserve its thermal storage state. It can also use the presence detection to schedule a recharge cycle to occur when no presence is detected. Presence detectors contemplated by the present invention include passive infrared detectors, ultrasonic detectors, and direct activity measurement such as a computer keystroke detector, etc. Contemplated optional information feedback devices 21 include lights, beeper or numerical displays which advise the user of operational modes, conditions or other details associated with the personal thermal comfort device.

In another embodiment of the present invention, external control of the system controller preferably is effected through a computer interface, typically at the workstation of the user. This interface could allow improved control of the system setpoints and functions and coordination with external systems such as building air conditioning systems. For example, a graphical user interface (GUI) could allow user-friendly operation of these more sophisticated tasks. Other contemplated and optional features such as the air stream modifiers 36 could be controlled through this computer interface.

Figure 3A:
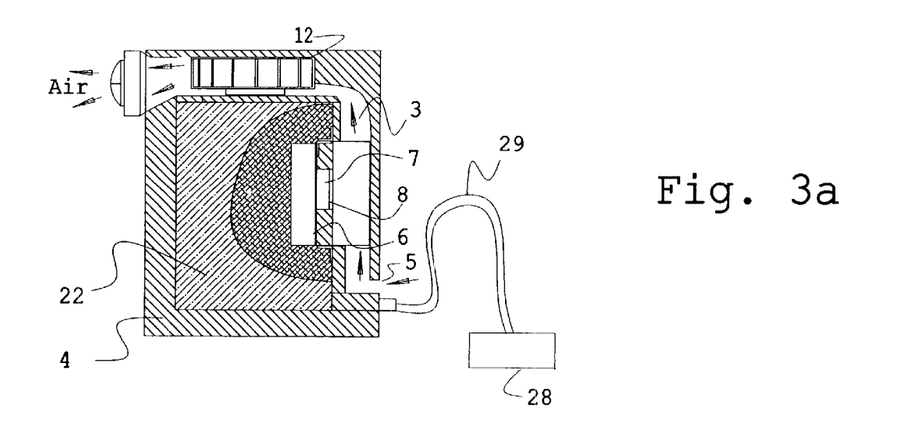
FIGS. 3a and 3b show a partially exposed side view and partial exposed overhead view respectively of one embodiment of the apparatus and system of the present invention, in which the cooling function is enhanced by water ice formation in the thermal store.
Figure 3B:
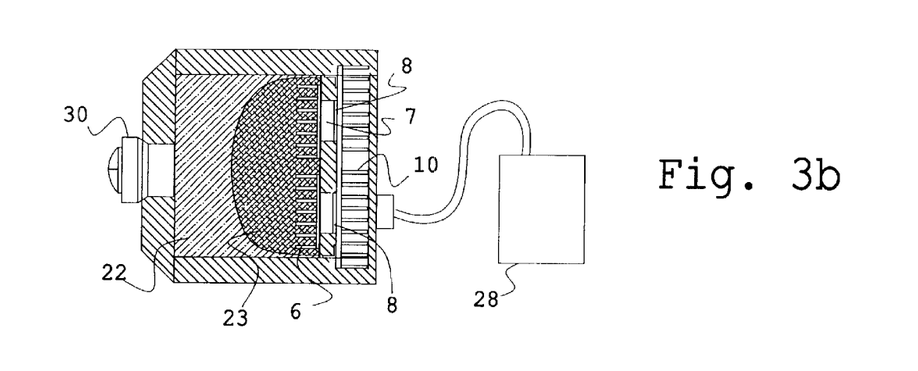

A further preferred embodiment of the invention uses a phase change thermal storage material such as the thermal mass within the thermal reservoir to improve the energy storage density and minimize the weight and volume of the device. The reservoir depicted in FIGS. 3a and 3b illustrate ice formation 23 in an aqueous solution 22, preferably substantially pure water, surrounding heat exchanger 6 shown with a multiplicity of fins to enhance the surface area. FIGS. 3a and 3b show a preferred embodiment of the invention using multiple heat pump devices 8 and multiple heat exchangers 10 (also incorporating an extended surface area) in order to achieve the desired performance with specific components. In this embodiment, blower 12 is positioned downstream of the air side heat exchanger 10, discharging through nozzle 30 with the air being admitted through the inlet 5. Duct 3 provides for communication of this airflow between the components. In order to achieve the insulation 4 thickness required to reduce heat flow between the reservoir and parts having a relatively different temperature, it is often necessary to provide a conductive separator block 7 between the reservoir heat exchanger 6 and the air side heat exchanger 10. In this embodiment, power supply unit 28 is positioned remotely from the thermal comfort unit itself, with connection between the units achieved via cable 29. The power supply may also be contained within the structure of the personal thermal comfort device. A contained or external battery or line operated power supply may be used as a power supply for the device, as would be understood by one skilled in the field.

During discharge operation, wherein the flowing air is cooled by the heat pumping action of 8, with the heat delivered to the thermal mass consisting primarily of ice 23 and water 22, the pumped heat melts the ice, recovering its latent energy. The heat of fusion thus recovered from the phase change generally maintains the reservoir mass temperature until the ice has reverted to liquid water. This heat of fusion is about 144 Btu/lb. of ice melted as compared with a liquid water energy storage density of about 1 Btu/lb. for each degree Fahrenheit of temperature increase in the water mass. The greater energy density of the ice thus utilized in the invention, reduces the size and weight requirement of the reservoir for given air-cooling performance. In addition, the energy required by the heat pump device to cool the air during use is decreased as the reservoir temperature is lowered. This has been found particularly true in the case of thermoelectric heat pumps, which are relatively inefficient when pumping heat against significant differential temperatures. A personal thermal comfort device as shown in FIGS. 3a and 3b require less than about 10 watts of electrical power to a thermoelectric device for much of the discharge time to provide about 5° F. at about 10 cf. air flow of personal cooling. As illustrated, the ice pack 23 forms at the surface of the heat exchanger 6. This results in some insulating effect due to the reduced conductivity of ice. A process of reversing the heat pump heat flow-periodically to permit the ice to release from the heat exchanger is a contemplated and preferred alternative to improve the overall ice formation rate relative to continuous ice formation.

Figure 4A:
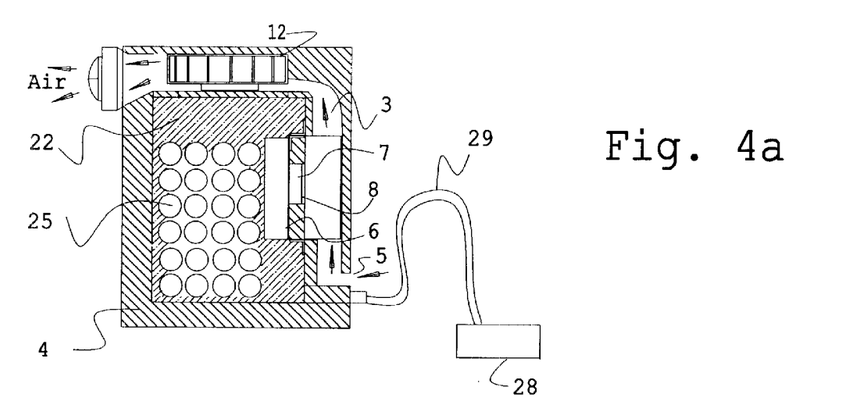
FIGS. 4a and 4b show a partially exposed side view and partially exposed overhead view respectively of one embodiment of the present invention; the use of a contained phase change thermal storage media within the thermal store.
Figure 4B:
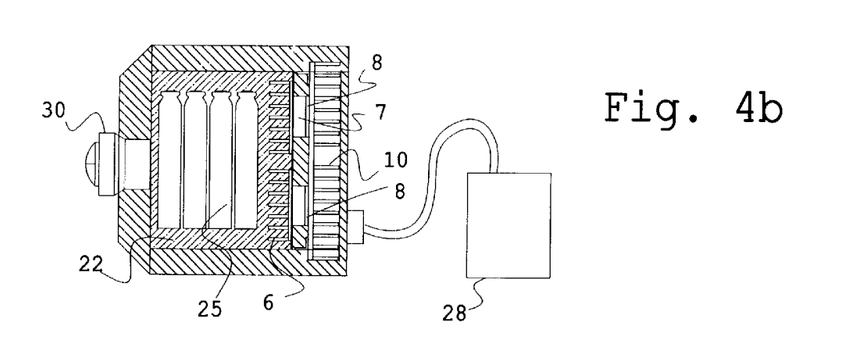

Other thermal storage media such as gas clathrate hydrates are known and may be incorporated into the thermal storage reservoir of the personal comfort device as shown in FIGS. 4a and 4b. See, for example, U.S. Pat. Nos. 4,922,998 and 5,054,540. In this case, containers of a phase-changing thermal storage media 25 are immersed in a surrounding heat transfer media 22 such as water. As in the case of the embodiments shown in FIGS. 3a and 3b, where the melting of ice generally maintains the thermal reservoir temperature, a beneficial phase change in the contained thermal media will also reduce the rate of increase of reservoir temperature during cooling (discharge). A stirring device (mechanical, sonic, vibratory, etc.) can also be included in a liquid-filled thermal store to eliminate thermal stratification and improve heat transfer. This thermal storage media may also be in direct thermal contact with any surface thermally connected to the heat pump device.

Figure 5:
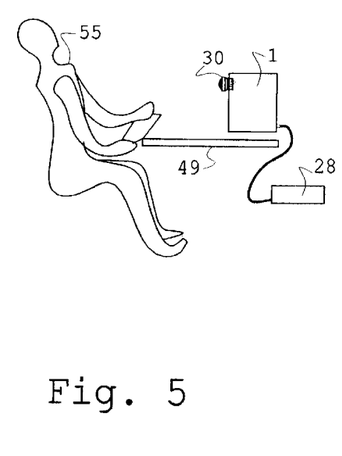
FIG. 5 shows the application of one embodiment of the present invention on a work surface to provide thermal comfort to a single person.
Figure 6:
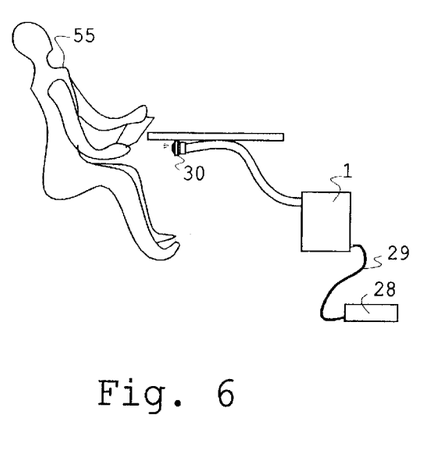
FIG. 6 shows the use of one embodiment of the present invention beneath a work surface with the air discharge extended through the use of a conduit between the invention and the discharge nozzle.

In operation, the physical location of the apparatus of the present invention is preferably proximate to the user. It may be positioned on a work surface 49 as shown in FIG. 5. The user 55 places the device 1 nearby and adjusts the discharge nozzle 30 to direct the airflow to achieve the desired comfort level. An external power supply 28, if used, may be placed in a convenient location. In some cases, particularly during heat use, the personal comfort device can be advantageously placed beneath the work surface as shown in FIG. 6, optionally using an air conduit to permit greater distance of the device from the user. The discharge nozzle 30 may then be located closer to the user to achieve a greater thermal benefit. As in FIG. 5. the power supply 28 is shown to be remote from the unit, conducting the supplied power through cable 29. If the system were to stand without operation while the reservoir is significantly above or below ambient temperature, natural convection may occur through conductive heat transfer to the air side heat exchanger 10. Flow-limiting doors to occlude the air duct through the device would reduce or eliminate this energy loss.

Another embodiment of the present invention includes a class of device to provide the same personal thermal comfort benefits to one or more users from a larger floor-mounted system. A single thermal cooling system coupled to multiple air handlers may be more cost-effective per workstation than an equivalent number of self-contained desktop units. A larger multi-user device would allow the cost-effective use of more energy-efficient heat pumping technology than is practical in a desktop system. A larger physical store would also permit additional flexibility in its use, such as longer discharge time before recharge is needed. Such a contemplated design incorporates many features common to the desktop system described in FIGS. 3*a* and 3*b*. The active heat pump element is similarly used to alter the thermal energy stored in a reservoir. The major difference is that the air-handling portion of the system that provides conditioned air to the user may be mounted remotely from the thermal mass, either on or off the desktop. In this example, a pair of insulated liquid lines attach to the reservoir unit with one line connected to a pumped manifold and acting as the feed line and the other acting as a return line to the reservoir. Each of the air handler units contains a temperature sensor for feedback temperature control of the air to meet the individual preferences of the user. Cooling demand is met with cool water flow from the reservoir optionally combined with a heat pump, typically a thermoelectric module. Resistance heating in the thermoelectric module provides for the heating demand. The multi-station system may then take advantage of the various individual demands, some with heating requirements and some with cooling needs, to achieve optimal energy use in a personal comfort system. Aside from providing for individual control connections, the control aspects of the multi-station system are very similar to those outlined in the desktop unit.

EXAMPLE 1

An example of the device shown in FIGS. 3*a* and 3*b* was constructed and tested. This device consisted of the requisite insulated thermal storage reservoir, filled with water 22 in thermal contact with a finned metal plate 6. The physical size was approximately 0.5 cubic foot. For this example, ice 23 is not formed. Two thermoelectric devices 8 arranged electrically in series were placed in thermally conductive contact with the metal plate 6 through conductive blocks 7. An air side heat exchanger 10 was placed in thermal contact with the opposite side of thermoelectric devices 8 and located within air duct 3. Blower 12 provided for airflow from the air inlet 5, through heat exchanger 10 to discharge through adjustable nozzle 30. Direct electrical current, switchable in both voltage and polarity, was applied to the terminals of the thermoelectric devices 8 from power supply 28. The power supply also supplied electrical power to operate blower 12.

Figure 7:
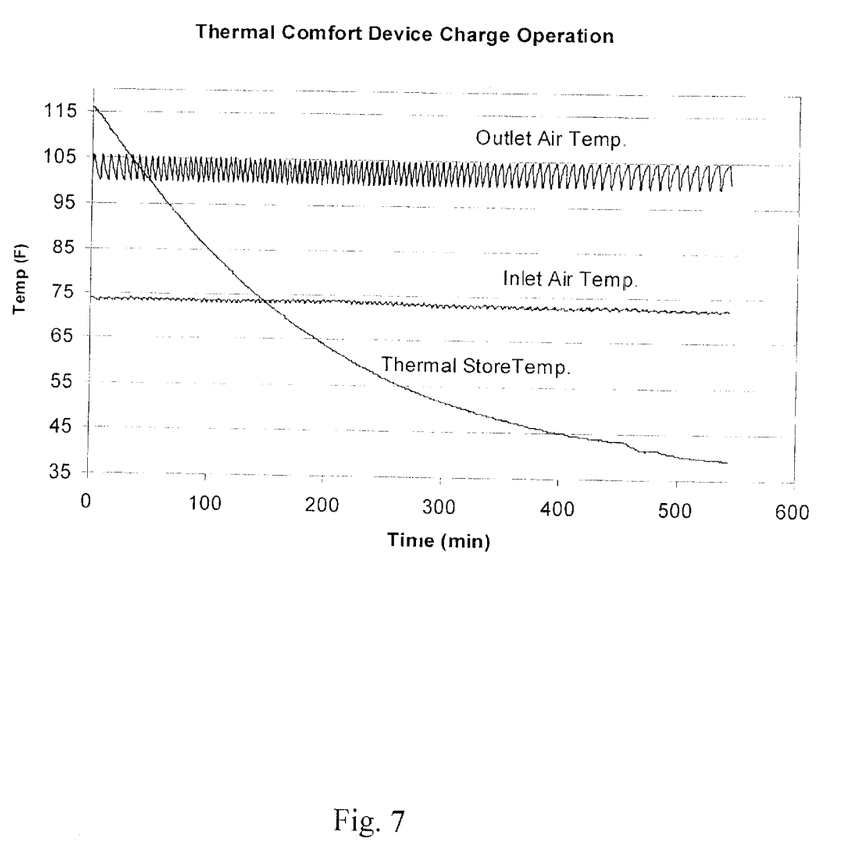
FIG. 7 is a time vs. temperature graph of the inlet air temperature, outlet air temperature and the thermal store temperature during the charge process to remove heat from the store.

A resulting charge temperature plot FIG. 7 shows the ambient inlet air temperature between about 70° F. and about 75° F. and the nozzle air temperature between about 95° F. and about 105° F. while heat is removed from the thermal reservoir (store) decreasing its temperature. In this case, a control means was programmed to monitor the discharge temperature and switch the voltage applied to the thermoelectric heat pump to prevent discharge air temperatures higher than about 105° F. For the purposes of providing heat for personal comfort, the blower speed was adjusted to a lower setting by decreasing blower motor voltage. Full power was applied to the thermoelectric heat pump 8. This resulted in higher output air temperatures than are shown in FIG. 7. An air temperature obtained in the region of about 120° F. has provided a comfortable degree of warmth to many office workers. The configuration was otherwise identical as that for charge. It is evident to those skilled in the art that the system of the present invention could be designed to support cooling use or heating use only.

Figure 8:
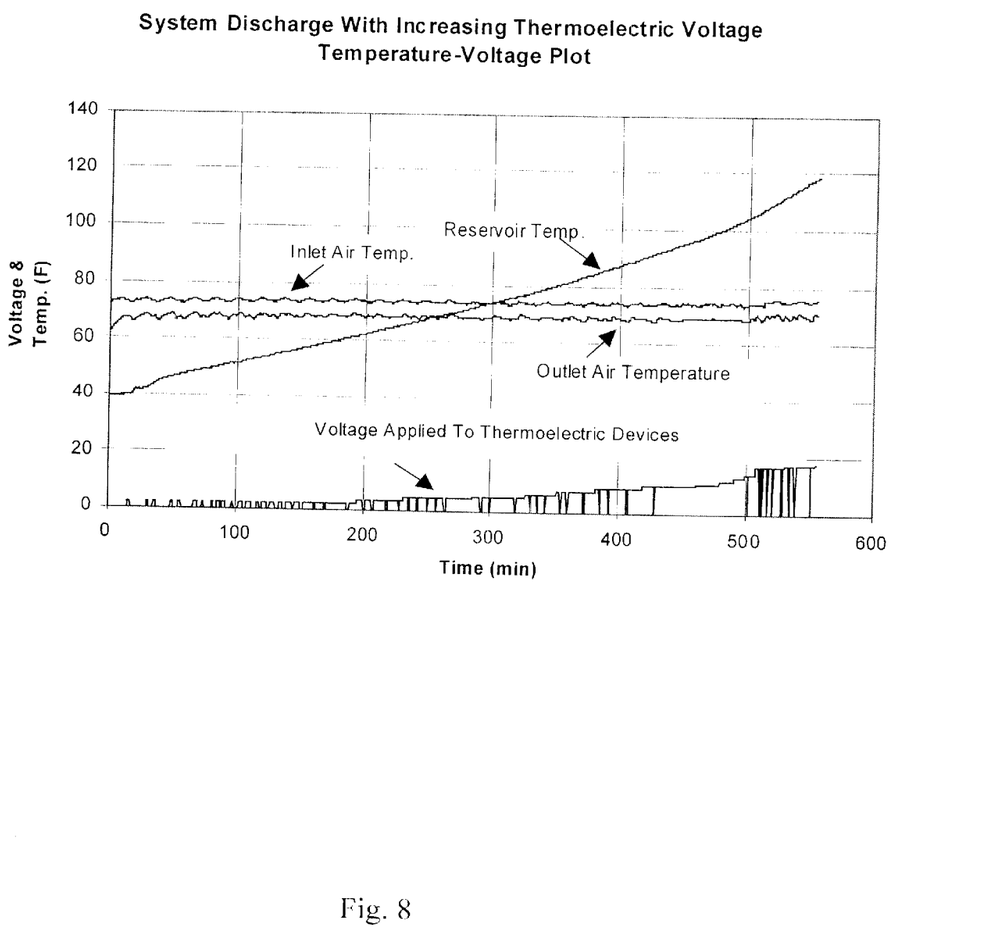
FIG. 8 is a time vs. temperature graph of the inlet air temperature, outlet air temperature, thermal store temperature and increasing thermoelectric voltage applied during the discharge process to provide cooling to the air flowing through the device.

Discharge operation of the device to cool the flowing air by an average of about 5.5° F. is shown in FIG. 8. It was discovered that, at such a temperature reduction, a discharge air velocity, leaving nozzle 30 at about 700 fpm provides substantial additional cooling in an office environment. The thermal store temperature of the device increased in temperature as the outlet air was cooled by the action of the thermoelectric heat pump transferring heat from the air into the thermal store. The discharge operation, as shown in FIG. 8 illustrates the modulation of the voltage applied to the thermoelectric devices (two individual modules wired in series) during discharge. A gradual increase in the power consumed by the heat pump, by matching the power applied to the required pumping load, extended the time of discharge available since the dissipated energy plus the energy removed from the air, heated the thermal store. At the beginning of discharge, the thermal reservoir was typically well below ambient temperature and conductive heat transfer provided most of the required cooling of the air. As the discharge proceeded, (causing the thermal mass 22 to increase in temperature), a larger portion of the heat was transferred by the thermoelectric devices 8 to maintain the outlet air temperature at the desired temperature level.

A variety of control levels and features are contemplated by the present invention, and may be included in a personal thermal comfort device as illustrated in FIG. 2. A minimal control system allows control of the power applied to the thermoelectric device(s), polarity reversal for altering the direction of heat transfer, and control operation of the fan. It is understood that separate controllers could be used for each function. A more advanced controller, as was used in the device of this example, permitted closed loop control of outlet air temperature, user adjustment of temperature setpoints, and made continuous adjustment of voltage applied to the heat pumping device to achieve the greatest power efficiency. Blower speed control and display 21 outputs were provided by the control system 18.

The manual input panel 20 provided for selection of the operational modes of the unit, whether in heat output, cool output or off. A charge switch allowed selection of manual (forced charge) or automatic control determined by the program. Other selectors permitted user control over the output temperature and fan speed. A display provided user feedback on the current state of the system.

The control system employed the following control elements: two thermoelectric modules, a fan to circulate the air, a relay to control power application to the thermoelectric modules, a polarity control relay to set the polarity of the DC power applied to the thermoelectric modules. Additionally, a voltage switching relay is one form of voltage control to use with a multiple output voltage power supply. One or more relays select one of several available voltages to connect to the thermoelectric modules. The controller to determine the voltage to be supplied preferably uses temperature sensors for inlet air, outlet air and thermal reservoir temperatures. A single-digit LED numerical display 21 provided information feedback to the user to allow monitoring of control modes and condition of reservoir temperature to predict remaining operational time. Panel switches provided manual control of the system. An electronic controller was used to determine the system operation, operate the display and relays and sense temperatures.

In the case of the example of FIG. 3, thermoelectric modules acted as the prime movers to determine the heat flow rate and direction between the thermal storage reservoir and the airflow. One of three electric power levels (high, low or off) were applied to the modules by wiring in series or parallel with the power supply, or disconnected from the power supply via relays. This allows inexpensive and relatively efficient control of the power to the thermoelectric elements.

For cool charge operation, the fan speed was set to full speed to minimize air side heat sink temperature. The polarity was set to cool the reservoir. Low or high voltage levels were applied to the cooling modules to maintain the outlet air temperature within an efficient operating range. The charge was terminated when a low temperature setpoint was reached, typically at the point that the reservoir temperature was not decreasing significantly. The charge level was maintained in the reservoir either by periodically "topping off" the charge to cool back to the minimum temperature and then turning the thermoelectric power supply and fan power off, or by maintaining a reduced power charge function. This cycle was typically initiated by rise in thermal reservoir temperature, or by timer.

During cool discharge operation, the fan speed was set to design speed, reduced from maximum speed for comfort and efficient use of stored energy. The polarity was set to cool the air, warming the reservoir. Alternating lower (or off) and higher voltage levels applied to the cooling modules maintained the outlet air temperature at the steeping. This setpoint may be a specific temperature but typically will be a differential from the ambient temperature, adjustable by the user and is typically set at about 5° F. It was discovered that minimizing the hysterisis between the turn-on and turn-off temperatures resulted in significant improvement in system efficiency by reducing cycling loss. The hysterisis levels used in closed-loop control of the outlet air temperature relative to the inlet air temperature were about 1° F. and about 0.2° F. with the latter substantially improving the utilization of the reservoir energy by about 20%. The discharge was terminated when a maximum thermal store temperature was reached. We have found that a store temperature of about 120° F. at an ambient temperature of about 75° F. is a reasonable termination point. When the termination store temperature was reached, the system was switched off in preparation for a charge cycle to remove the absorbed heat.

The display indicated the time remaining before the termination was reached. This was calculated from the reservoir temperature, blower speed and the differential between outlet and inlet air temperature. A control or other system failure resulting in escalating reservoir temperatures was protected against by a thermal switch mounted on the reservoir. During heating operation, the fan speed was set to the design speed, reduced from maximum speed to prevent air velocity cooling effects. The polarity was set to heat the air, cooling the reservoir. Alternating low and high voltage levels applied to the thermoelectric modules maintained the outlet air temperature at the desired steeping. This setpoint was typically set to be about 120° F. The setpoint may also be a user adjusted differential from the ambient temperature or a fixed temperature. The display indicated the activity of heating function. A control or other system failure resulting in excessive air side heat sink temperatures was protected against by a thermal switch mounted on the air side heat exchanger.

For the flow rate used, it was discovered that the heating output consumed approximately 120 watts while, due to the cool storage characteristic of the system, the thermoelectric power during discharge averaged as low as about 5 watts over an eight hour discharge.

In the forgoing description it will be readily appreciated by those skilled in the art that modifications may be made to the invention without departing from the concepts disclosed herein. Such modifications are to be considered as included in the following claims, unless these claims by their language expressly state otherwise.

That which is claimed:

1. An apparatus for conditioning a localized zone comprising:

a thermal storage reservoir comprising a thermal storage mass;

a first heat exchange surface in communication with the thermal storage mass;

a second heat exchange surface located proximate to an air stream, said second heat exchanger in communication with a heat pump device having a voltage applied thereto, said heat pump device in communication with both heat exchange surfaces and capable of reversibly transferring heat from the first heat exchange surface to the second heat exchange surface;

an air moving device to create the air stream;

an air duct in communication with the air moving device to direct air taken from the localized zone to a position proximate to the second heat exchange surface;

a controller device to select a cooling mode for directing cool air to the localized zone or a heating mode for directing heated air to the localized zone, said controller device in communication with the heat pump device; and wherein byproduct heat generated during the cooling mode is directed to the thermal storage mass and stored concurrently during the cooling mode, and byproduct cooling effect generated during the heating mode is directed to the thermal storage mass reducing the enthalpy of the storage mass concurrently during the heating mode.

2. An apparatus for conditioning a localized zone comprising:

a thermal storage reservoir comprising a thermal storage mass;

a first heat exchange surface in communication with the thermal storage mass;

a second heat exchange surface located proximate to an air stream, said second heat exchanger in communication with a heat pump device having a voltage applied thereto, said heat pump device in communication with both heat exchange surfaces and capable of reversibly transferring heat from the first heat exchange surface to the second heat exchange surface;

an air moving device to create the air stream;

an air duct in communication with the air moving device to direct air taken from the localized zone to a position proximate to the second heat exchange surface;

a controller device to select a cooling mode for directing cool air to the localized zone, said controller device in communication with the heat pump device; and wherein heat generated during a cooling mode is directed to the thermal storage mass and stored concurrently during the cooling mode.

3. An apparatus for conditioning a localized zone comprising:
- a thermal storage reservoir comprising a thermal storage mass;
- a first heat exchange surface in communication with the thermal storage mass;
- a second heat exchange surface located proximate to an air stream, said second heat exchanger in communication with a heat pump device having a voltage applied thereto, said heat pump device in communication with both heat exchange surfaces and capable of reversibly transferring heat from the first heat exchange surface to the second heat exchange surface;
- an air moving device to create the air stream;
- an air duct in communication with the air moving device to direct air taken from the localized zone to a position proximate to the second heat exchange surface;
- a controller device for selecting a heating mode for directing heated air to the localized zone, said controller device in communication with the heat pump device; and
- wherein the cooling effect generated by the heat pump device during a heating mode is directed to the thermal storage mass and the enthalpy of the storage mass is reduced.

4. A personal environment system for conditioning a localized zone, comprising:
- a thermally insulated storage reservoir containing a thermal storage mass;
- a first heat exchange surface in communication with the thermal storage mass; said first heat exchange surface capable of exchanging heat with the thermal storage mass within the insulated storage reservoir;
- a second heat exchange surface in communication with a heat pump device, said heat pump device capable of reversibly transferring heat from the first heat exchange surface to the second heat exchange surface;
- an air-moving device to create an air stream;
- an air duct in communication with the air moving device to direct air from the localized zone into the device and proximate to the second heat exchange surface, and direct an air stream away from the second heat exchange surface and into the localized zone;
- a controller device in communication with the heat pump device for selecting a cooling mode or heating mode; and
- wherein the cooling mode provides both a cool air stream product having a temperature lower than an ambient temperature, and heat as a byproduct, substantially all of said heat byproduct being directed to and stored in the thermal storage mass and not released to the localized zone.

5. The apparatus according to claim 1, wherein the thermal storage mass is insulated and said storage mass is selected from the group consisting of water, and a water-containing solution.

6. The apparatus according to claim 1, wherein the thermal storage mass comprises a phase change material.

7. The apparatus according to claim 6, wherein the phase change material is selected from the group consisting of ice, gas hydrates, and combinations thereof.

8. The apparatus according to claim 1, wherein the heat pumping device is selected from the group consisting of a thermoelectric heat pump, a vapor compression heat pump, and an absorption heat pump.

9. The apparatus according to claim 1, wherein the air stream is directed away from the apparatus through a directable outlet.

10. The apparatus according to claim 9, wherein the outlet controls airstream flow rate exiting the apparatus.

11. The apparatus according to claim 1, wherein the air moving device controls the airstream flow rate.

12. The apparatus according to claim 9, wherein the outlet controls airstream direction exiting the apparatus.

13. The apparatus according to claim 1, wherein the apparatus may be activated manually or automatically.

14. The apparatus according to claim 1, wherein the apparatus releases the stored heat during a cool charge mode and absorbs heat during a heat charge mode.

15. The apparatus according to claim 14, wherein the charge mode may be activated manually or automatically.

16. The apparatus according to claim 1, further comprising a zone occupancy sensor in communication with the controller device for determining when the localized zone is occupied or about to be occupied.

17. The apparatus according to claim 16, wherein the zone occupancy sensor is selected from the group consisting of a passive infrared motion sensor, an ultrasonic motion sensor, and a signal generated as a result of keystroke activity at a workstation within the localized zone.

18. The apparatus according to claim 1, wherein the controller device is a microprocessor based controller.

19. The apparatus according to claim 1, wherein the controller device is a program running on the user's computer and an interface between the computer and the personal environment system.

20. The apparatus according to claim 1, wherein the controller device activates a charging mode after a preset interval of time during which no occupancy in the localized zone has been detected.

21. The apparatus according to claim 1, wherein the air passing through the apparatus may be modified to a preselected temperature.

22. The apparatus according to claim 1, wherein voltage is supplied to the heat pump device, and the voltage supplied to the apparatus is increased as the temperature of the thermal storage mass increases.

23. The apparatus according to claim 1, further comprising an air modifying device selected from the group consisting of filters, ionizing devices, aroma generating devices, humidifiers and combinations thereof.

24. The apparatus according to claim 1 further comprising a power connection feature.

25. The apparatus according to claim 1, further comprising an integrated power supply.

26. The apparatus according to claim 1, further comprising a resistance heater in communication with the air duct.

27. The apparatus according to claim 1, wherein the control device is in communication with and controls the air moving device.

* * * * *